United States Patent
May et al.

(10) Patent No.: US 10,683,607 B2
(45) Date of Patent: Jun. 16, 2020

(54) SLIP-RESISTANT PROTECTIVE MAT

(71) Applicant: TRIMACO, LLC, Morrisville, NC (US)

(72) Inventors: David Cleveland May, Durham, NC (US); Yichen Wang, Mebane, NC (US); Akashdeep Khera, Morrisville, NC (US)

(73) Assignee: TRIMACO, LLC, Morrisville, NC (US)

( * ) Notice: Subject to any disclaimer, the term of this patent is extended or adjusted under 35 U.S.C. 154(b) by 0 days.

(21) Appl. No.: 15/770,913

(22) PCT Filed: Nov. 2, 2016

(86) PCT No.: PCT/US2016/060109
§ 371 (c)(1),
(2) Date: Apr. 25, 2018

(87) PCT Pub. No.: WO2017/079294
PCT Pub. Date: May 11, 2017

(65) Prior Publication Data
US 2018/0305861 A1    Oct. 25, 2018

Related U.S. Application Data (60) Provisional application No. 62/249,806, filed on Nov. 2, 2015.

(51) Int. Cl.
*B05D 1/28*       (2006.01)
*D06N 7/00*       (2006.01)
(Continued)

(52) U.S. Cl.
CPC ............ *D06N 7/0071* (2013.01); *B32B 3/06* (2013.01); *B32B 3/10* (2013.01); *B32B 3/30* (2013.01);
(Continued)

(58) Field of Classification Search
CPC ........ B32B 2037/1215; B32B 2250/44; B32B 2255/02; B32B 2255/26;
(Continued)

(56) References Cited

U.S. PATENT DOCUMENTS 2,721,818 A      10/1955  Dolnick et al.
3,511,696 A  *    5/1970  Murray ................... B05C 1/083
                                                                    118/244

(Continued)

FOREIGN PATENT DOCUMENTS

WO     WO-2015111488 A1 *  7/2015  .......... C09J 23/0815

OTHER PUBLICATIONS

PCT International Search Report and Written Opinion for PCT/US2016/060109, completed Feb. 11, 2017.

*Primary Examiner* — Alexander M Weddle
(74) *Attorney, Agent, or Firm* — Barnes & Thornburg LLP (57) ABSTRACT

A non-slip mat comprises an absorbent top layer, an impermeable middle layer, a non-slip bottom layer, and a reinforced outer hem. The reinforced outer hem is formed on at least one edge of the non-slip mat by folding all the layers of non-slip mat at least once such that the bottom layer is facing the bottom layer and the top layer is disposed on both top and bottom surfaces. A method for applying an adhesive coating material on a canvas includes heating the adhesive coating material and at least one roller of an apparatus, advancing the canvas through the apparatus in a forward direction to contact the at least one heated roller, and while advancing the canvas, a uniform coating of the adhesive coating material is applied on a surface of the canvas with the at least one heated roller.

16 Claims, 4 Drawing Sheets

(51) Int. Cl.
| | |
|---|---|
| *B32B 7/02* | (2019.01) |
| *B32B 3/10* | (2006.01) |
| *B32B 5/02* | (2006.01) |
| *B32B 5/24* | (2006.01) |
| *B32B 7/08* | (2019.01) |
| *B32B 7/12* | (2006.01) |
| *B32B 25/08* | (2006.01) |
| *B32B 25/10* | (2006.01) |
| *B32B 25/18* | (2006.01) |
| *B32B 27/06* | (2006.01) |
| *B32B 27/08* | (2006.01) |
| *B32B 27/12* | (2006.01) |
| *B32B 27/30* | (2006.01) |
| *B32B 27/32* | (2006.01) |
| *B32B 27/36* | (2006.01) |
| *B32B 27/40* | (2006.01) |
| *B32B 37/12* | (2006.01) |
| *B32B 37/15* | (2006.01) |
| *B32B 3/30* | (2006.01) |
| *B32B 3/06* | (2006.01) |
| *B32B 25/04* | (2006.01) |

(52) U.S. Cl.
CPC ............ *B32B 5/024* (2013.01); *B32B 5/028* (2013.01); *B32B 5/245* (2013.01); *B32B 7/02* (2013.01); *B32B 7/08* (2013.01); *B32B 7/12* (2013.01); *B32B 25/04* (2013.01); *B32B 25/08* (2013.01); *B32B 25/10* (2013.01); *B32B 25/18* (2013.01); *B32B 27/065* (2013.01); *B32B 27/08* (2013.01); *B32B 27/12* (2013.01); *B32B 27/304* (2013.01); *B32B 27/306* (2013.01); *B32B 27/32* (2013.01); *B32B 27/36* (2013.01); *B32B 27/40* (2013.01); *B32B 37/1284* (2013.01); *B32B 37/15* (2013.01); *D06N 7/0068* (2013.01); *B32B 2037/1215* (2013.01); *B32B 2250/44* (2013.01); *B32B 2255/02* (2013.01); *B32B 2255/26* (2013.01); *B32B 2262/0276* (2013.01); *B32B 2262/062* (2013.01); *B32B 2266/0235* (2013.01); *B32B 2305/188* (2013.01); *B32B 2307/538* (2013.01); *B32B 2307/718* (2013.01); *B32B 2307/72* (2013.01); *B32B 2307/744* (2013.01); *B32B 2309/02* (2013.01); *B32B 2325/00* (2013.01); *B32B 2471/04* (2013.01); *D06N 2209/106* (2013.01); *D06N 2213/061* (2013.01); *D06N 2213/065* (2013.01)

(58) Field of Classification Search
CPC ...... B32B 2262/0276; B32B 2262/062; B32B 2266/0235; B32B 2305/188; B32B 2307/538; B32B 2307/718; B32B 2307/72; B32B 2307/744; B32B 2309/02; B32B 2325/00; B32B 2471/04; B32B 25/04; B32B 25/08; B32B 25/10; B32B 25/18; B32B 27/065; B32B 27/08; B32B 27/12; B32B 27/304; B32B 27/306; B32B 27/32; B32B 27/36; B32B 27/40; B32B 27/1284; B32B 27/15; B32B 3/06; B32B 3/10; B32B 3/30; B32B 5/024; B32B 5/028; B32B 5/245; B32B 7/02; B32B 7/08; B32B 7/12; B32B 2266/718; B32B 2266/72; B32B 2266/744; D06N 2209/106; D06N 2213/061; D06N 2213/065; D06N 7/0068; D06N 7/0071
USPC ......................................................... 427/359
See application file for complete search history.

(56) References Cited

U.S. PATENT DOCUMENTS

| | | | |
|---|---|---|---|
| 3,629,027 A * | 12/1971 | Germain | D06M 17/00 156/167 |
| 9,044,917 B1 | 6/2015 | Terracino et al. | |
| 2002/0108942 A1* | 8/2002 | Yamanoi | H05B 1/0241 219/497 |
| 2003/0008137 A1* | 1/2003 | Bohm | B32B 5/02 428/343 |
| 2003/0219566 A1 | 11/2003 | Berkowitz et al. | |
| 2004/0038607 A1 | 2/2004 | Williamson et al. | |
| 2004/0148887 A1 | 8/2004 | Di Pede | |
| 2009/0110925 A1* | 4/2009 | Fukuda | C09J 123/14 428/355 EN |
| 2009/0321001 A1 | 12/2009 | Dye et al. | |
| 2010/0224318 A1* | 9/2010 | Morita | A61F 13/15707 156/291 |
| 2014/0141204 A1 | 5/2014 | Calkins | |
| 2014/0363610 A1* | 12/2014 | Sameoto | B81C 99/009 428/92 |
| 2017/0009110 A1* | 1/2017 | Saito | C09J 123/16 |

* cited by examiner

SLIP-RESISTANT PROTECTIVE MAT

CROSS-REFERENCE TO RELATED APPLICATIONS

This application is the U.S. national phase of PCT/US2016/060109, filed on Nov. 2, 2016. PCT/US2016/060109 claims priority 35 U.S.C. § 119 to U.S. Prov. App. No. 62/249,806 filed Nov. 2, 2015, entitled "SLIP-RESISTANT PROTECTIVE MAT," the entirety of each of which is incorporated herein by reference in its entirety.

TECHNICAL FIELD

The present invention generally relates to a slip-resistant sheet or drop cloth used to protect an object, surface, or the like. The present invention particularly relates to a method of coating a drop cloth with an adhesive coating material to prevent the drop cloth from slipping.

BACKGROUND

In general, painters use drop cloths to protect surfaces while painting. For example, drop cloths are used to absorb spilled, splattered, or over-sprayed paint. Drop cloths may be used to protect any working surface, including, but not limited to, floors, furniture, counters, and stairs. However, the working surface may not provide enough resistance to prevent the drop cloth from slipping, thereby increasing the painters' risk of falls.

SUMMARY

According to one aspect of the present disclosure, a non-slip mat comprises a top layer, a middle layer, a bottom layer, and a reinforced outer hem. The top layer is comprised of a woven material and has a first surface and a second surface. The middle layer is comprised of a first synthetic polymer and has a third surface and a fourth surface. The bottom layer is comprised of a second synthetic polymer that is different than the first synthetic polymer and has a fifth surface and a sixth surface. The reinforced outer hem is formed on at least one edge of the non-slip mat by folding all the layers of non-slip mat at least once inwardly toward the bottom layer. The bottom layer has a repeated pattern. The entire second surface of the top layer is bonded to the entire third surface of the middle layer, and the entire fourth surface is bonded to the entire fifth surface of the bottom surface.

In some embodiments, the top layer is made of a woven material having a weight from about 6 ounces per square yard to about 8 ounces per square yard.

In some embodiments, the middle layer is made of a low-density polyethylene (LDPE).

In some embodiments, the bottom layer is made of PVC resin and polyester mesh.

In some embodiments, the PVC resin and polyester mesh of the bottom layer forms a webbed network, the webbed network comprises a series of nodes in a repeating alignment.

In some embodiments, the bottom layer comprises one or more nodes forming a webbed network, the webbed network has an average column number density of nodes from about 90 to about 110 nodes per square inch.

In some embodiments, the top layer, the middle layer, and the bottom layer are bonded through a lamination process.

According to another aspect of the present disclosure, a method for applying an adhesive coating material on a canvas comprises: (i) heating the adhesive coating material to a temperature such that the coating material reaches at least a liquid state; (ii) heating at least one roller of an apparatus to apply a uniform thickness of the adhesive coating material; (iii) advancing the canvas through the apparatus in a forward direction to contact the at least one heated roller; (iv) applying, while advancing the canvas, a uniform coating of the adhesive coating material on a surface of the canvas with the at least one heated roller; and (v) cooling the coated canvas to a room temperature. The step of applying the uniform coating of the adhesive coating material comprises: (i) applying the adhesive coating material on the at least one heated roller, and (ii) contacting the surface of the canvas with the at least one heated roller moving in a direction opposite to the travel of the canvas.

In some embodiments, the step of heating the adhesive coating material comprises heating the adhesive coating material to the temperature ranging from about 180° C. to about 190° C.

In some embodiments, the step of heating at least one roller of the apparatus comprises heating the roller to the temperature ranging from about 180° C. to about 220° C.

In some embodiments, the adhesive coating material is a slip resistance material that increases a frictional force.

In some embodiments, the adhesive coating material is styrene ethylene butylene styrene (SEBS).

In some embodiments, the canvas is made of cotton.

In some embodiments, the canvas is made of polyester.

In some embodiments, the canvas is made of cotton and polyester blend.

In some embodiments, the uniform thickness of the adhesive coating material is about 1% of a thickness of the canvas.

In some embodiments, the uniform thickness of the adhesive coating material is about 1.5% of a thickness of the canvas.

In some embodiments, the uniform thickness of the adhesive coating material ranges from about 1% to about 1.5% of a thickness of the canvas.

In some embodiments, the step of applying the uniform coating of the adhesive coating material comprises applying the adhesive coating material on the at least one heated roller.

In some embodiments, the step of applying the uniform coating of the adhesive coating material comprises applying a predetermined amount of the adhesive coating material on the canvas.

According to another aspect of the present disclosure, a mat comprises a first layer, a second layer, and a third layer. The first layer consists of a woven material and is connected to the second layer and the third layer. The second layer consists of a first synthetic polymer and is connected to the first layer and third layer. The third layer consists of a second synthetic polymer. The second synthetic polymer is different from the first synthetic polymer. The third layer is connected to the first layer and the second layer.

In some embodiments, the first layer is a woven material having a weight from about 6 ounces per square yard to about 8 ounces per square yard.

In some embodiments, the second layer is a low-density polyethylene.

In some embodiments, the third layer comprises PVC resin and polyester mesh.

In some embodiments, the PVC resin and polyester mesh form a webbed network, and wherein the webbed network comprises a series of nodes in a repeating alignment.

In some embodiments, the third layer comprises one or more nodes forming a webbed network. The webbed network has an average column number density of nodes from about 90 to about 110 nodes per square inch.

In some embodiments, the static coefficient of friction is from about 1.37 to about 2.00.

In some embodiments, the kinetic coefficient of friction is from about 1.30 to about 1.94.

In some embodiments, the first layer, the second layer, and the third layer are connected through a first process and a second process that is different from the first process.

In some embodiments, the first process is lamination and the second process is stitching.

In some embodiments, the lamination process includes an adhesive material.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Figure 1:
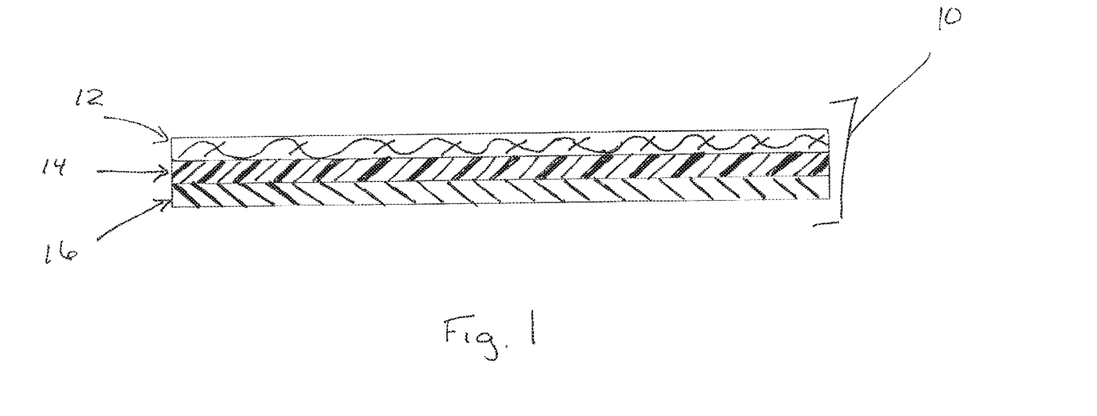
FIG. 1 is a simplified cross-sectional view of the slip-resistant, multi-layered mat.

Referring now to FIG. 1, a cross-sectional view of the slip-resistant protective sheet 10 is shown. In the illustrative embodiment, the slip-resistant protective sheet 10 includes a top layer 12, a middle layer 14, and a bottom layer 16. It should be appreciated that, in some embodiments, the slip-resistant protective sheet 10 may include only a top layer 12 and a bottom layer 16. In the illustrative embodiment, the top layer 12 is an absorbent layer, the middle layer 14 is an impermeable layer, and the bottom layer 16 is a slip-resistant layer. For example, the slip-resistant protective sheet 10 may be used by painters to protect a floor or other surfaces while painting. In use, the absorbent top layer 12 is configured to absorb any liquid, such as paint, that was spilled on the slip-resistant protective sheet 10 to reduce the risk of slipping. The impermeable middle layer 14 is configured to protect against liquid or other debris penetrating through the slip-resistant protective sheet 10 and damaging underlying surfaces. The slip resistant bottom layer 16 is configured to reduce the risk of slipping caused by movement from stepping on the slip-resistant protective sheet 10. The bottom layer 16 allows the slip-resistant protective sheet 10 to remain stationary while being draped over furniture, stairs, and other surfaces, without the application of additional force across the top layer 12. The slip-resistant protective sheet 10 is configured to be light weight and thin. In some embodiments, the slip-resistant protective sheet 10 is less than about 6 ounces per square yard and less than about 0.1 centimeters thick.

In the illustrative embodiment, the top layer 12 is a woven material. The woven material may be a plain weave or a twill weave material. The woven material may be, for example, plain canvas, duck canvas, or any similarly absorbent material. In one embodiment, the woven material may have a yarn count of about 9.0 to about 9.5 s. In another embodiment, the woven material may be about 40 warps per inch. In another embodiment, the woven material may be from about 40 warps per inch to about 45 warps per inch. In another embodiment, the woven material may be from about 35 warps per inch to about 50 warps per inch. In another embodiment, the woven material may be from about 25 wefts per inch to about 28 wefts per inch. In another embodiment, the woven material may be from about 18 wefts per inch to about 25 wefts per inch. In another embodiment, the woven material may be from about 28 wefts per inch to about 35 wefts per inch. In some embodiments, the woven material may be comprised of 55% cotton and 45% polyester. In some embodiments, the woven material may be a canvas having a weight of about 6 ounces per square yard. In other embodiments, the woven material may be a canvas having a weight from about 4 ounces per square yard to about 10 ounces per square yard.

In the illustrative embodiment, the impermeable middle layer 14 is made of a synthetic polymer. The synthetic polymer may be a low-density polyethylene (LDPE). In the illustrative embodiment, the middle layer 14 has a thickness ranging from about 18 micrometers to about 20 micrometers. In another embodiment, the middle layer 14 may have a thickness from about 10 micrometers to about 30 micrometers. As discussed above, in some embodiments, the slip-resistant protective sheet 10 may not have a middle layer 14.

In the illustrative embodiment, the bottom layer 16 is a slip-resistant layer comprised of a synthetic polymer. In one embodiment, the synthetic polymer may be a polyvinyl chloride (PVC) foam. In another embodiment the bottom layer 16 may be comprised of a mixture of PVC resin and polyester mesh. In the illustrative embodiment, the bottom layer 16 comprises about 97% PVC resin and about 3% polyester mesh. In one embodiment, the density of the bottom layer 16 is about 180 to about 200 grams per square meter (GSM). In another embodiment, the density of the bottom layer 16 is from about 100 to about 300 GSM. In another embodiment, the synthetic polymer of the bottom layer 16 may include one or a combination of polyurethane, latex, styrene-butadiene rubber, ethylene vinyl acetate, and/ or a halogenated vinyl. In another embodiment, the bottom layer 16 may have a thickness ranging from about 0.3 millimeters to about 0.6 millimeters. In another embodiment, the thickness of the bottom layer 16 may range from about 0.01 millimeters to about 1.5 millimeters.

The top layer 12 is bonded to the middle layer 14 and the middle layer 14 is bonded to the bottom layer 16. In one embodiment, the top layer 12 may be folded back on itself to be bonded to the bottom layer 16. In some embodiments, the top layer 12 is bonded to the middle layer 14 and the middle layer is bonded to the bottom layer 16 by means of lamination. In one embodiment, the lamination process may include an adhesive material. In another embodiment, the lamination process may be performed by means of a heating process. In another embodiment, the lamination process may be performed by means of a pressure sensitive process. The bonding of all layers, including any seams, may be connected through stitching or by forming reinforced hems on at least one edge of the slip-resistant protective sheet 10. The reinforced hem 24 is formed at the edge of the slip-resistant protective sheet 10 by folding all layers of slip-resistant protective sheet 10 at least once such that the top layer 12 is disposed on both top and bottom surfaces. In some embodiments, the slip-resistant protective sheet 10 may be folded more than once to form the reinforced hem 24. The outer hem 24 may be reinforced by stitching the folded layers and/or reinforced with an adhesive material.

Figure 2:
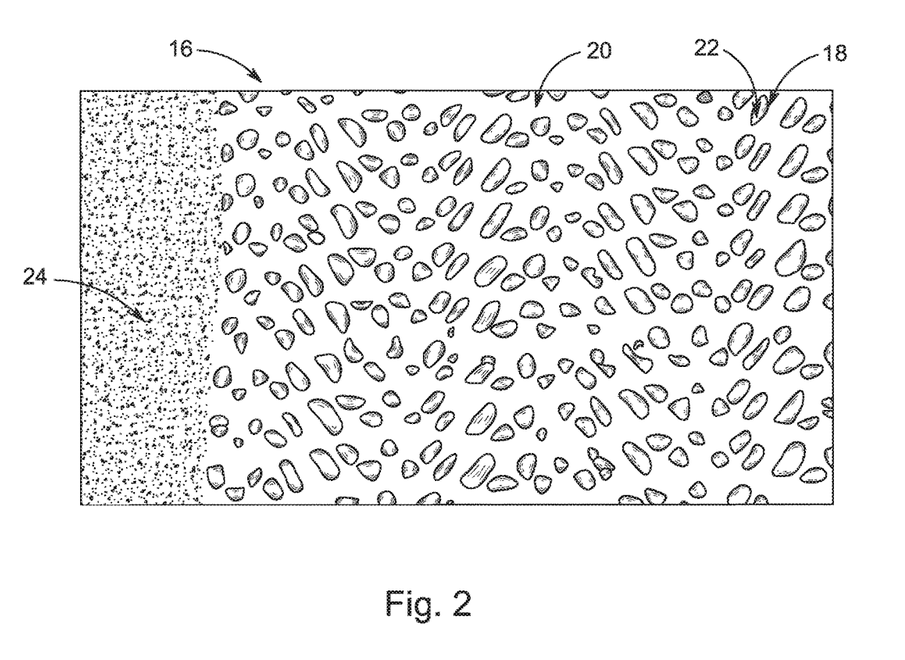
FIG. 2 is a bottom plan view of the slip-resistant, multi-layered mat of FIG. 1 with a ruler shown for reference.

Referring now to FIG. 2, the bottom layer 16 comprises a series of nodes 18 forming a webbed network 20. For purposes of disclosure, a node 18 is a continuous unit of synthetic polymer extending around a void 22. The void 22 is encompassed by a node 18. In the illustrative embodiment, the nodes 18 align in a repeated pattern. In other embodiments, the nodes 18 may be arranged in a random fashion. In the illustrative embodiment, the nodes 18 have an average column number density of about 100 nodes per square inch. In some embodiments, the average column number density of nodes may be from about 75 nodes to about 125 nodes per square inch.

Standard testing was performed to determine the coefficient of static and kinetic friction of the slip-resistant protective sheet 10 on various surfaces, for example, wood laminate, ceramic tile, and carpet. American Society for Testing and Material (ASTM) D1894-14 Static and Kinetic Coefficient of Friction of Plastic Film and Sheeting test procedures are incorporated herein by reference. The TAPPI T548 standard test procedures are incorporated herein by reference. Additional methods to measure coefficients of friction are contemplated.

The static and kinetic coefficients of friction of the bottom layer 16 measured by ASTM D1894-14 on wood laminate is shown in TABLE 1.

TABLE 1

| Material ID | Test Number | Static Load (g) | Sled Weight (g) | Static Coefficient Of Friction | Kinetic Load (g) | Sled Weight (g) | Kinetic Coefficient Of Friction |
|---|---|---|---|---|---|---|---|
| Sample # 1 | 1 | 91.1 | 200.0 | 0.456 | 85.1 | 200.0 | 0.426 |
| Uncoated Canvas | 2 | 91.2 | 200.0 | 0.456 | 86.2 | 200.0 | 0.431 |
| (Tested Material | 3 | 93.3 | 200.0 | 0.467 | 87.4 | 200.0 | 0.437 |
| ID side) | 4 | 104 | 200.0 | 0.520 | 87.0 | 200.0 | 0.435 |
|  | 5 | 95.7 | 200.0 | 0.479 | 85.4 | 200.0 | 0.427 |
|  | Average |  |  | 0.475 |  |  | 0.431 |
|  | Std. Dev. |  |  | 0.027 |  |  | 0.0050 |
| Sample # 3 | 1 | 361 | 200.0 | 1.81 | 282 | 200.0 | 1.41 |
| PVC Coated Canvas | 2 | 375 | 200.0 | 1.88 | 308 | 200.0 | 1.54 |
| (Tested White | 3 | 400 | 200.0 | 2.00 | 331 | 200.0 | 1.66 |
| Foam side) | 4 | 400 | 200.0 | 2.00 | 326 | 200.0 | 1.63 |
|  | 5 | 361 | 200.0 | 1.81 | 334 | 200.0 | 1.67 |
|  | Average |  |  | 1.90 |  |  | 1.58 |
|  | Std. Dev. |  |  | 0.098 |  |  | 0.11 |

Sample #1 represents an uncoated canvas having only the top layer 12. Sample #3 represents the slip-resistant protective sheet 10 having the PVC coated bottom layer 16. As shown in TABLE 1, Sample #3 has higher coefficient of both the static and kinetic friction compared to Sample #1. The coefficient of static friction is the friction force between two objects when neither of the objects is moving. The coefficient of kinetic friction is the force between two objects when one object is moving, or if two objects are moving against each other. For example, the static coefficient of friction of Sample #1 measured on wood laminate ranges from about 0.456 to about 0.520, and the average static coefficient of friction is about 0.475. Whereas, the static coefficient of friction of Sample #3 measured on wood laminate ranges from about 1.81 to about 2.00, and the average static coefficient of friction is about 1.90. Additionally, the kinetic coefficient of friction of Sample #1 measured on wood laminate ranges from about 0.426 to about 0.437, and the average kinetic coefficient of friction is about 0.431. Whereas, the kinetic coefficient of friction of Sample #3 measured on wood laminate ranges from about 1.41 to about 1.67, and the average kinetic coefficient of friction is about 1.58.

The static and kinetic coefficients of friction of the bottom layer 16 measured by ASTM D1894-14 on ceramic tile is shown in TABLE 2.

TABLE 2

| Material ID | Test Number | Static Load (g) | Sled Weight (g) | Static Coefficient Of Friction | Kinetic Load (g) | Sled Weight (g) | Kinetic Coefficient Of Friction |
|---|---|---|---|---|---|---|---|
| Sample # 1 | 1 | 79.2 | 200.0 | 0.396 | 73.7 | 200.0 | 0.369 |
| Uncoated Canvas | 2 | 74.2 | 200.0 | 0.371 | 71.7 | 200.0 | 0.359 |
| (Tested Material | 3 | 72.7 | 200.0 | 0.364 | 66.9 | 200.0 | 0.335 |
| ID side) | 4 | 72.8 | 200.0 | 0.364 | 65.0 | 200.0 | 0.325 |
| | 5 | 70.6 | 200.0 | 0.353 | 61.9 | 200.0 | 0.310 |
| | Average | | | 0.370 | | | 0.339 |
| | Std. Dev. | | | 0.016 | | | 0.024 |
| Sample # 3 | 1 | 377 | 200.0 | 1.89 | 259 | 200.00 | 1.30 |
| PVC Coated Canvas | 2 | 316 | 200.0 | 1.58 | 318 | 200.00 | 1.59 |
| (Tested White | 3 | 347 | 200.0 | 1.74 | 349 | 200.00 | 1.75 |
| Foam side) | 4 | 376 | 200.0 | 1.86 | 366 | 200.00 | 1.84 |
| | 5 | 378 | 200.0 | 1.89 | 388 | 200.00 | 1.94 |
| | Average | | | 1.79 | | | 1.68 |
| | Std. Dev. | | | 0.14 | | | 0.25 |

Similar to TABLE 1, Sample #1 represents an uncoated canvas having only the top layer 12. Sample #3 represents the slip-resistant protective sheet 10 having the PVC coated bottom layer 16. As shown in TABLE 2, Sample #3 has higher coefficient of both the static and kinetic friction compared to Sample #1. For example, the static coefficient of friction of Sample #1 measured on ceramic tile ranges from about 0.353 to about 0.396, and the average static coefficient of friction is about 0.370. Whereas, the static coefficient of friction of Sample #3 measured on ceramic tile ranges from about 1.58 to about 1.89, and the average static coefficient of friction is about 1.79. Additionally, the kinetic coefficient of friction of Sample #1 measured on ceramic tile ranges from about 0.310 to about 0.369, and the average kinetic coefficient of friction is about 0.339. Whereas, the kinetic coefficient of friction of Sample #3 measured on ceramic tile ranges from about 1.30 to about 1.94, and the average kinetic coefficient of friction is about 1.68.

The static and kinetic coefficients of friction of the bottom layer 16 measured by ASTM D1894-14 on carpet is shown in TABLE 3.

TABLE 3

| Material ID | Test Number | Static Load (g) | Sled Weight (g) | Static Coefficient Of Friction | Kinstic Load (g) | Sled Weight (g) | Kinetic Coefficient Of Friction |
|---|---|---|---|---|---|---|---|
| Sample # 1 | 1 | 139 | 200.0 | 0.695 | 120 | 200.0 | 0.600 |
| Uncoated Canvas | 2 | 161 | 200.0 | 0.805 | 137 | 200.0 | 0.685 |
| (Tested Material | 3 | 157 | 200.0 | 0.785 | 142 | 200.0 | 0.710 |
| ID side) | 4 | 152 | 200.0 | 0.760 | 132 | 200.0 | 0.660 |
| | 5 | 170 | 200.0 | 0.850 | 130 | 200.0 | 0.650 |
| | Average | | | 0.779 | | | 0.661 |
| | Std. Dev. | | | 0.057 | | | 0.041 |
| Sample # 3 | 1 | 273 | 200.0 | 1.37 | 280 | 200.0 | 1.40 |
| PVC Coated Canvas | 2 | 303 | 200.0 | 1.52 | 293 | 200.0 | 1.47 |
| (Tested White | 3 | 300 | 200.0 | 1.50 | 309 | 200.0 | 1.55 |
| Foam side) | 4 | 320 | 200.0 | 1.60 | 331 | 200.0 | 1.66 |
| | 5 | 306 | 200.0 | 1.53 | 319 | 200.0 | 1.60 |
| | Average | | | 1.50 | | | 1.53 |
| | Std. Dev. | | | 0.086 | | | 0.10 |

Sample #1 represents an uncoated canvas having only the top layer 12. Sample #3 represents the slip-resistant protective sheet 10 having the PVC coated bottom layer 16. As shown in TABLE 3, Sample #3 has higher coefficient of both the static and kinetic friction compared to Sample #1. For example, the static coefficient of friction of Sample #1 measured on carpet ranges from about 0.695 to about 0.850, and the average static coefficient of friction is about 0.779. Whereas, the static coefficient of friction of Sample #3 measured on carpet ranges from about 1.37 to about 1.60, and the average static coefficient of friction is about 1.50. Additionally, the kinetic coefficient of friction of Sample #1 measured on carpet ranges from about 0.600 to about 0.710, and the average kinetic coefficient of friction is about 0.661. Whereas, the kinetic coefficient of friction of Sample #3 measured on carpet ranges from about 1.40 to about 1.66, and the average kinetic coefficient of friction is about 1.53.

TABLES 1-3 illustrate that the slip-resistant protective sheet 10 having the PVC coated bottom layer 16 improves the non-slip property of the sheet 10, which reduces a risk of slipping when working on the slip-resistant protective sheet 10.

Figure 3:
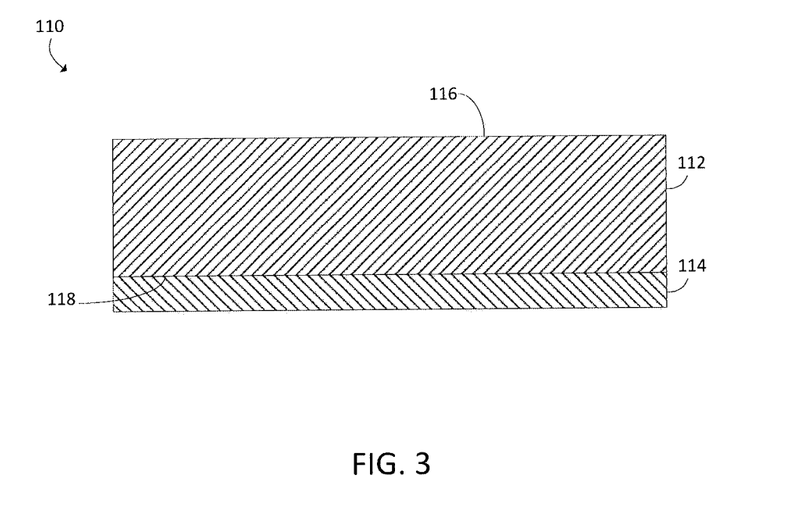
FIG. 3 is a cross-sectional view of a slip-resistant protective sheet.

Referring to FIG. 3, a cross-section of a slip-resistant protective cover or sheet 110 is shown. The slip-resistant protective sheet 110 includes a protective sheet 112 and a slip-resistant coating layer 114. The protective sheet 112 has a top surface 116 and a bottom surface 118, which is coated with an adhesive coating material to form the slip-resistant coating layer 114 to increase a frictional force.

The slip-resistant protective sheet 110 is used to protect a floor or other surfaces in the work environment, and the slip-resistant coating layer 114 provides a slip-resistance surface to reduce workers' chances of falls and helps to hold the slip-resistant protective sheet 110 in place. For example, painters may use the slip-resistant protective sheet 110 to protect the floor or other surfaces while painting. The slip-resistant coating layer 114 of the slip-resistant protective sheet 110 reduces a risk of slipping when working on the slip-resistant protective sheet 110.

The protective sheet 112 may be made of a blend of cotton and polyester. In one embodiment, the protective sheet 112 may be comprised of about 70% cotton and about 30% polyester. In some embodiments, the protective sheet 112 may be a woven material. The woven material may be a plain weave or a twill weave material. The woven material may be, for example, plain canvas, duck canvas, or any similarly absorbent material. In some embodiments, the protective sheet 112 may be made solely from cotton or polyester. It should be appreciated that, in some embodiments, the protective sheet 112 may include a multiple layers. In such embodiment, each layer may be made of a different material.

In the illustrative embodiment, the adhesive coating material to form the slip-resistant coating layer 114 is styrene ethylene butylene styrene (SEBS). However, it should be appreciated that, in other embodiments, the adhesive coating material may be a mixture of elastomeric polymers or other materials that increase a frictional force to provide a slip resistance.

Figure 5:
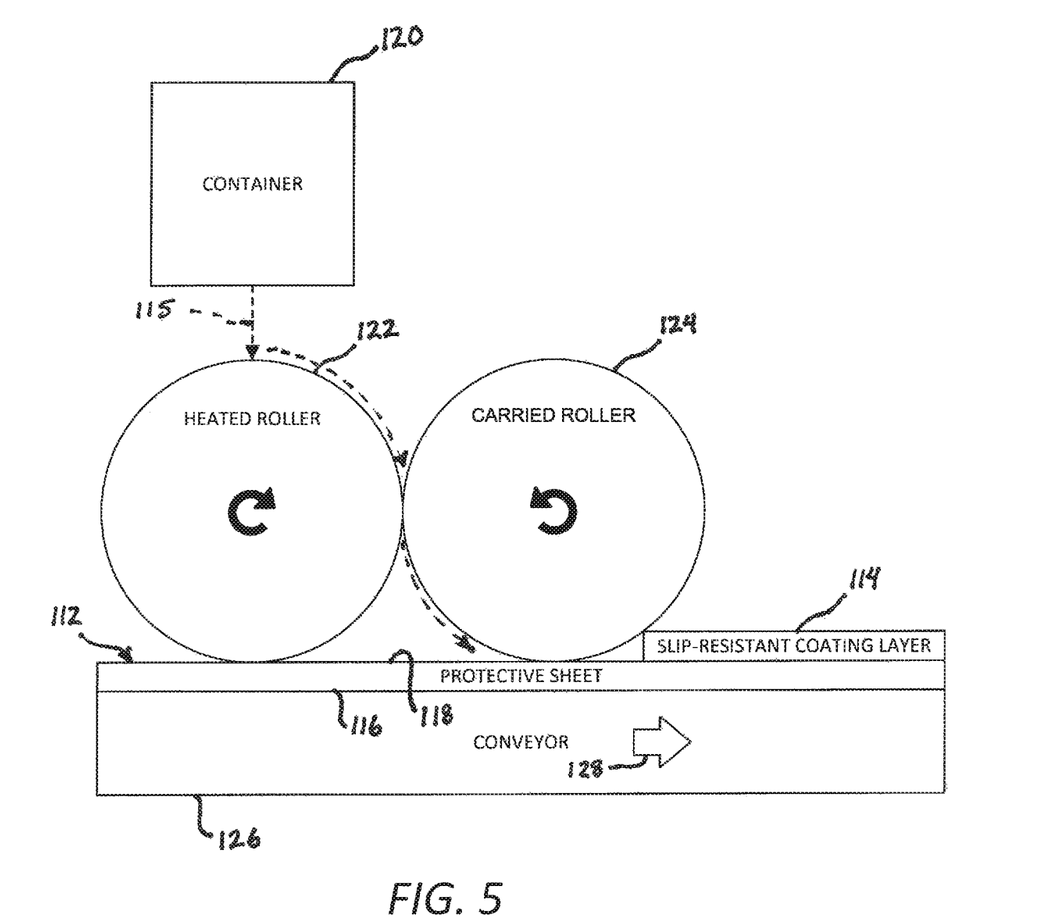
FIG. 5 is a diagrammatic view of an apparatus for applying an adhesive coating material on a canvas.

In use, the adhesive coating material 115 is placed on the protective sheet 112 using a coating apparatus, as shown in FIG. 5. The coating apparatus includes a container 120, a main roller (or heated roller) 122, a carried roller 124, and a conveyor belt 126. In the illustrative embodiment, the container 120 is positioned above the conveyor belt 126, and the main roller 122 and the carried roller 124 are positioned between the container 120 and the conveyor belt 126. The adhesive coating material is placed in the container 120 and is heated to a predefined temperature, at which the adhesive coating material is in its liquid state and has an appropriate viscosity for best slip resistance proprieties to form the slip-resistant coating layer 114 of the slip-resistant protective sheet 110. Depending on the selected adhesive coating material, the range of appropriate viscosity is determined. For example, in the illustrative embodiment, when SEBS reaches a temperature between about 180° C. to about 190° C., SEBS is in its liquid state and has appropriate viscosity for best slip resistance proprieties to form the slip-resistant coating layer 114. The container 120 is configured to discharge a predetermined amount of adhesive coating material to be applied on the protective sheet 112. The conveyor belt 126 is configured to carry the protective sheet 112 through the coating apparatus in a forward direction 128 while the adhesive coating material is applied on the protective sheet 112.

The adhesive coating material is uniformly applied using the main and carried rollers 122, 124. To do so, the main roller 122 is heated to about 220° C. to maintain appropriate viscosity properties of the adhesive coating material throughout its application on the protective sheet 112. In some embodiments, the main roller 122 may be heated to a temperature between about 180° C. to about 220° C. It should be appreciated that the main roller 122 and the carried roller 124 are positioned side-by-side contacting one another, such that the heat from the main roller 122 may be transferred to the carried roller 124 via conduction. In such embodiment, the adhesive coating material is discharged from the container 120 onto the heated main roller 122 and subsequently transferred to the carried roller 124. Both the main roller 122 and the carried roller 124 are in contact with the protective sheet 112, which is fed underneath the main and carried rollers 122. 124.

It should be appreciated that, in some embodiments, both the main roller 122 and the carried roller 124 may be heated to a desired temperature. In some embodiments, the main roller 122 and carried roller 124 may be positioned side-by-side without contacting one another, such that the main roller 122 is configured to apply the adhesive coating material on the protective sheet 112, and the carried roller 124 is configured to uniformly spread out the applied adhesive coating material on the protective sheet 112.

The adhesive coating material is uniformly applied on the protective sheet 112 to form the slip-resistant coating layer 114. In the illustrated embodiment, the uniform thickness of the slip-resistant coating layer 114 is about 1% of a thickness of the protective sheet 112. It should be appreciated that, in some embodiments, the thickness of the slip-resistant coating layer 114 may be between about 1% to about 1.5% of the thickness of the protective sheet 112.

Figure 4:
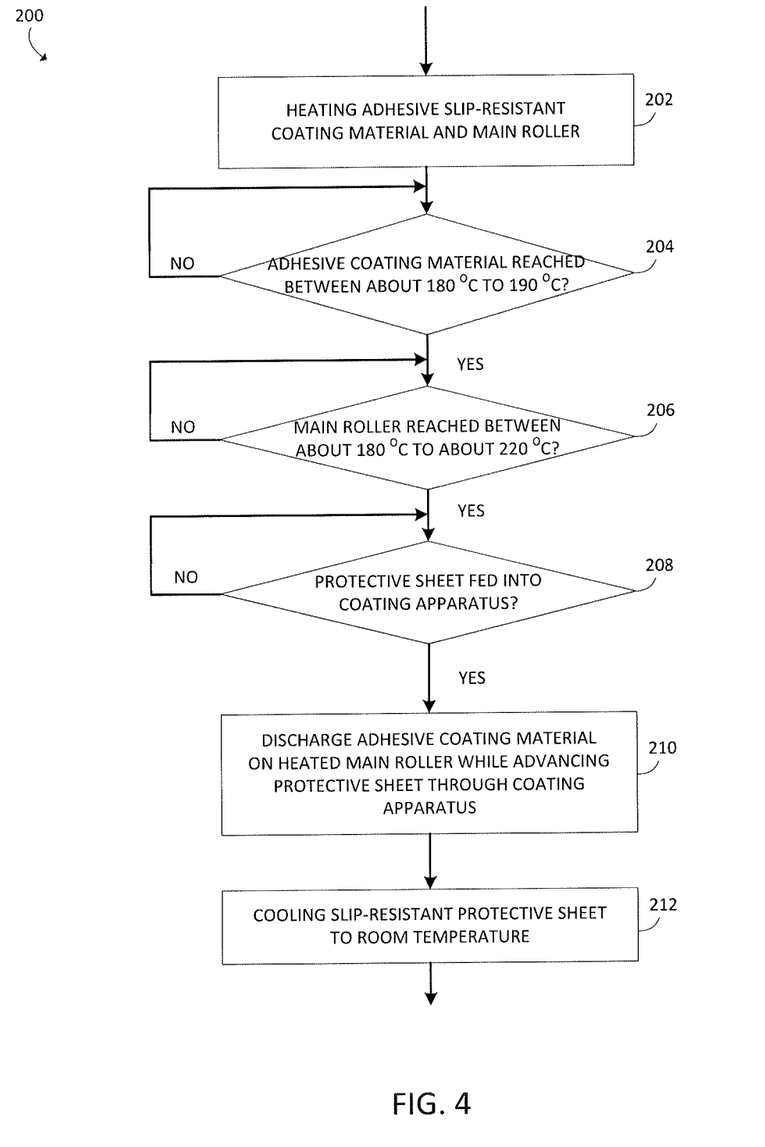
FIG. 4 is a simplified flow diagram of at least one embodiment of a method for producing the slip-resistant protective sheet of FIG. 3.

Referring now to FIG. 4, the adhesive coating material is applied using a method 200. The method 200 begins with block 202 in which the adhesive coating material and the main roller of the coating apparatus are heated by the coating apparatus. The adhesive coating material is heated by heating the container of the coating apparatus. If the adhesive coating material is determined to be heated to a temperature between about 180° C. to about 190° C. in block 204, the method 200 advances to block 206. If not, the method 200 loops back to block 204 to continue to monitor for the temperature of the adhesive coating material to reach between about 180° C. to about 190° C. In block 206, the temperature of the main roller of the coating apparatus is examined to further determine whether the main roller has reached a temperature between about 180° C. to about 220° C. If not, the method 200 loops back to block 206 to continue to monitor for the temperature of the main roller to reach between about 180° C. to about 220° C. If the main roller has reached the temperature between about 180° C. to about 220° C., the method 200 advances to block 208 to determine whether the protective sheet 112 has been fed into the coating apparatus via the conveyor belt. If not, the method 200 loops back to block 208 to continue to monitor for the protective sheet 112 to be fed into the coating apparatus. If the protective sheet 112 is detected on the coating apparatus, the method 200 advances to block 210.

In block 210, the heated adhesive coating material is discharged from the container onto the heated main roller. Simultaneously, the protective sheet 112 advances through the coating apparatus in a forward direction, such that the top surface 116 of the protective sheet 112 is facing the conveyor belt, and the bottom surface 118 of the protective sheet 112 contacts both the main roller and the carried roller. As a result, the adhesive coating material is uniformly applied on the bottom surface 118 of the protective sheet 112 using the main and carried rollers. It should be noted that at least one of the main and carried rollers is moving in a direction opposite to the travel of the protective sheet 112.

The thickness of the slip-resistant coating layer 114 is about 1% of a thickness of the protective sheet 112. As described above, in some embodiments, the thickness of the slip-resistant coating layer 114 may be between about 1% to about 1.5% of a thickness of the protective sheet 112.

Once a uniform layer of the slip-resistant coating layer 114 is formed on the protective sheet 112, the resulting slip-resistant protective sheet 110 is removed from the conveyor belt of the coating apparatus and cooled down to room temperature. Once the slip-resistant protective sheet 110 is cooled down to room temperature, the slip-resistant protective sheet 110 may be cut into a predetermined size.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There exist a plurality of advantages of the present disclosure arising from the various features of the apparatus, system, and method described herein. It will be noted that alternative embodiments of the apparatus, system, and method of the present disclosure may not include all of the features described yet still benefit from at least some of the advantages of such features. Those of ordinary skill in the art may readily devise their own implementations of the apparatus, system, and method that incorporate one or more of the features of the present invention and fall within the spirit and scope of the present disclosure.

What is claimed is:

1. A method for applying an adhesive coating material on a canvas comprising:
    heating the adhesive coating material in a container to a temperature such that the coating material reaches at least a liquid state;
    heating at least one roller of an apparatus to provide at least one heated roller configured to apply a uniform thickness of the adhesive coating material;
    discharging the adhesive coating material from the container onto the at least one heated roller located beneath the container;
    advancing the canvas through the apparatus in a forward direction to contact the at least one heated roller; and
    applying, while advancing the canvas, a uniform coating of the adhesive coating material on a surface of the canvas with the at least one heated roller;
    wherein applying the uniform coating of the adhesive coating material comprises: (i) applying the adhesive coating material on the at least one heated roller, and (ii) contacting the surface of the canvas with the at least one heated roller such that the direction of travel of a surface of the heated roller contacting the canvas is moving in a direction opposite to the travel of the canvas, and
    wherein the apparatus further comprises a carried roller positioned in side-by-side contact with the heated roller and both the heated roller and the carried roller are in contact with the canvas.

2. The method of claim 1, wherein heating the adhesive coating material comprises heating the adhesive coating material to the temperature ranging from about 180° C. to about 190° C.

3. The method of claim 1, wherein heating at least one roller of the apparatus comprises heating the roller to the temperature ranging from about 180° C. to about 220° C.

4. The method of claim 1, wherein the adhesive coating material is a slip resistance material that increases a frictional force in comparison to a canvas without the adhesive coating material.

5. The method of claim 1, wherein the adhesive coating material is styrene ethylene butylene styrene (SEBS).

6. The method of claim 1, wherein the canvas comprises cotton.

7. The method of claim 1, wherein the canvas comprises polyester.

8. The method of claim 1, wherein the canvas comprises cotton and polyester blend.

9. The method of claim 1, wherein the uniform thickness of the adhesive coating material is about 1% of a thickness of the canvas.

10. The method of claim 1, wherein the uniform thickness of the adhesive coating material is about 1.5% of a thickness of the canvas.

11. The method of claim 1, wherein the uniform thickness of the adhesive coating material ranges from about 1% to about 1.5% of a thickness of the canvas.

12. The method of claim 1, wherein applying the uniform coating of the adhesive coating material comprises applying a predetermined amount of the adhesive coating material on the canvas.

13. The method of claim 1, wherein the adhesive coating layer is transferred from the heated roller to the carried roller prior to being applied on the canvas.

14. The method of claim 13, wherein the heated roller and the carried roller are counter-rotating relative to one another.

15. The method of claim 1, wherein the heated roller and the carried roller are located between the container and the conveyor.

16. The method of claim 1, wherein the carried roller is a heated roller.

* * * * *